Patented May 1, 1951

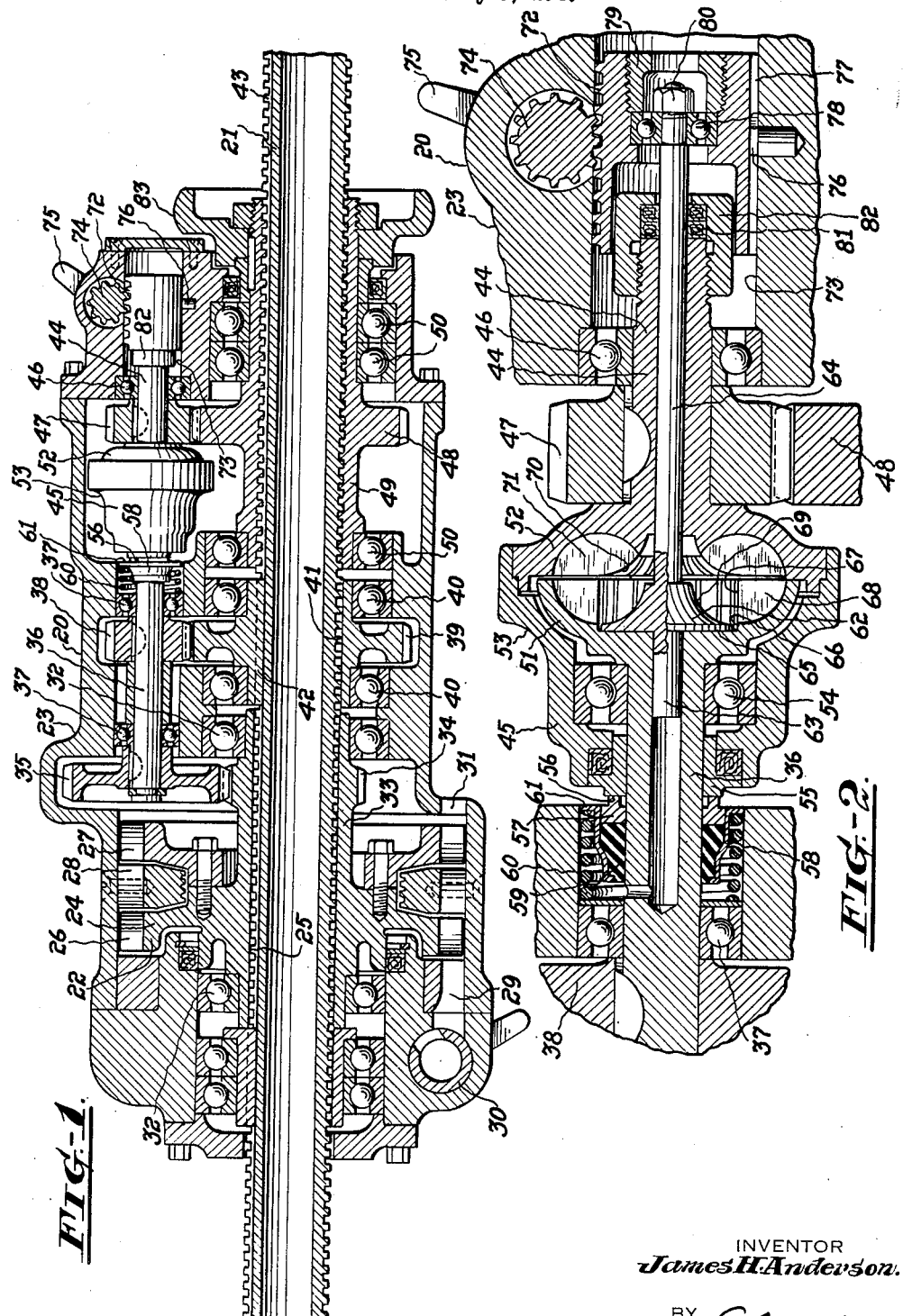

2,551,409

UNITED STATES PATENT OFFICE 2,551,409

DRILLING MACHINE

James H. Anderson, Easton, Pa., assignor to Ingersoll-Rand Company, New York, N. Y., a corporation of New Jersey Application July 9, 1946, Serial No. 682,245

10 Claims. (Cl. 74—424.8)

This invention relates to drilling machines, and more particularly to drilling machines of the rotary type using diamond cutting bits, or the like, to form a drill hole.

One object of the invention is to enable the feeding movement of the drilling implement to be controlled at an infinite number of rates of speeds.

Another object is to enable the rate of feeding movement of the drilling implement to be conveniently varied while the drilling machine is in operation.

Other objects will be in part obvious and in part pointed out hereinafter.

In the drawings accompanying this specification and in which similar reference numerals refer to similar parts, Figure 1 is a longitudinal elevation, partly broken away, of a drilling machine constructed in accordance with the practice of the invention, and Figure 2 is a similar view, somewhat enlarged, of the train of elements that effect axial movement of the drilling implement.

Referring more particularly to the drawings, 20 designates, in general, a drilling machine and 21 a feed screw actuated by the drilling machine and extending therethrough for connection with a drilling implement.

The drilling implement is not shown but may be of a well known type that is suitably secured to the feed screw 21 and consists of rod sections screwed together for lengthening it at regular increments of depth of the hole being drilled. The feed screw 21 accordingly has a range of movement, endwise, approximately equal to the length of a rod section so that additions may be conveniently made to the drilling implement without necessitating the removal of the drilling machine from its operative position.

The feed screw 21 is actuated by a turbine 22, in the forward portion of the casing 23 of the drilling machine, and comprising a bucket wheel 24 having an axial bore 25 through which the feed screw 21 extends. The wheel 24 has two rows of buckets 26 and 27, and a diaphragm 28 is arranged between the rows for directing motive fluid from the buckets 26 to the buckets 27.

Such motive fluid, as for example compressed air, is conveyed to the turbine wheel 24 by a passage 29 in the casing 23, and a throttle valve 30 controls communication between a source of motive fluid supply (not shown) and the passage 29. The casing 23 is also provided with an exhaust port, or ports, 31 for the escape of the exhaust fluid to the atmosphere.

The wheel 24 is supported by anti-friction bearings 32 and has an annular extension 33 upon the periphery of which is a gear 34 that forms a part of a train of elements serving to rotate the feed screw and meshes with a gear 35 on a drive shaft 36 arranged in parallelism with the feed screw. The drive shaft 36 is supported by anti-friction bearings 37 and carries a pinion 38 which meshes with a gear 39 encircling the feed screw 21.

The gear 39 is supported by anti-friction bearings 40 and has a bore 41 to receive the feed screw. A key or rib 42 in the bore 41 extends into a slot 43 in the periphery of the feed screw to slidably interlock the gear 39 to the feed screw.

The drive shaft 36 is axially aligned with a driven shaft 44, and rotary motion is transmitted from the drive shaft to the shaft 44 by a variable torque transmitting device 45. The shaft 44 is supported in the casing by an anti-friction bearing 46 and carries a pinion 47 which meshes with a gear 48 on the periphery of a feed nut 49 for the feed screw 21. The ratios of the gears 38—39 and 47—48 are so selected that the feed nut 49 will rotate at a faster rate than the feed screw 21 to cause endwise movement of the feed screw with respect to the feed nut. The feed nut is suitably supported by anti-friction bearings 50 and is threaded internally for cooperation with the threads of the feed screw.

The torque transmitting device 45 may be in the form of a magnetic coupling but is preferably, as shown, a fluid coupling having the usual impeller 51 and runner 52 carried by the shafts 36 and 44, respectively. The impeller 51 is housed in a casing 53 that is in sealing engagement with the peripheral portion of the runner 52, and an anti-friction bearing 54 is interposed between the casing 53 and the shaft 36 to hold the casing concentrically with the shaft 36 and to enable said casing 53 to rotate freely with respect to said shaft.

In the free end of the casing 53 is a sleeve 55 that encircles the shaft 36, and the outer end of the sleeve 55 constitutes a sealing surface 56 for cooperation with a sealing ring 57 to prevent leakage of fluid from the coupling. The sealing ring 57 lies within a holder 58 in the casing 23, and a rubber sleeve 59 in the holder and embracing the shaft 36 serves as a yieldable abutment for the sealing ring. A spring 60 interposed between the anti-friction bearing 37 and a flange 61 on the holder constantly urges the holder and its contents in the direction of the sealing surface 56.

To the end that the feeding pressure on the drilling implement may be conveniently varied in accordance with variations in the degree of hardness of the rock being drilled, the fluid coupling is provided with means for controlling the circulatory action of the fluid therein. In a preferred form, such means consists of a reciprocatory valve 62 having stem portions 63 and 64 slidable in the shafts 36 and 44, respectively.

The portion 65 of maximum diameter of the valve is of disc shape and, in the inoperative position of the valve, lies within a shallow recess 66 in the impeller 51. Its diameter is preferably only slightly less than the adjacent inner edges 67 of the impeller vanes 68.

The valve is of generally conical shape and the peripheral surface 69 of the conical portion of the valve is concaved to conform substantially with the curvature of rounded edges 70 at the inner portions of the vanes 71 of the runner 52. The surface 69 thus also conforms substantially with the curvature of the inner surface of the impeller 51 and serves to guide the fluid issuing from the runner to the entrance ends of the spaces between the impeller vanes 68.

The valve 62 is reciprocable in the coupling and is actuated thus by means located at the rearward end of the drilling machine. In the form shown, such means comprises a rack 72, slidable in a bore 73 in the casing. The rack 72 is actuated endwise by a pinion 74 having an operating lever 75 and is held against rotary movement by a key 76 embedded in the casing 23 and extending into a slot 77 in the rack 72.

Within the rack is an anti-friction bearing 78 which is held in position by a plug 79 that bears against the outer race of the bearing 78, and the inner race of the anti-friction bearing 78 is secured to the free end of the valve stem 64 by a nut 80. Owing to this arrangement the valve 62 may rotate freely with respect to the rack and may be moved readily endwise to its various controlling positions by means of the rack and the pinion 74.

In order to prevent the leakage of fluid from the coupling through the shaft 44 along the surface of the stem 64 a packing member 81 is disposed at the free end of the shaft 44 to encircle the stem 64 and is compressed by a gland 82 threaded onto the shaft 44.

In the operation of the device and with the valve 62 in the retracted position wherein the disc portion 65 lies in the recess 66, the fluid within the coupling will circulate at maximum velocity and the feed nut 49 will then move the feed screw 21 toward the work at a maximum rate of speed. Whenever, owing to the nature of the rock being drilled the feeding pressure applied to the feed screw is found to be insufficient or excessive, the valve 62 is shifted axially by means of the pinion 74 and the rack 72, to widen or reduce the flow path for the fluid issuing from the runner and flowing to the inlet ends of the spaces between the impeller vanes 68. In consequence, the circulation of fluid through the coupling will be accelerated or retarded, as the case may be, and the rotary movement of the driven shaft 44 and the feed nut 49 will be varied accordingly to change the rate of feeding movement of the feed screw 21.

The valve 62, as will be readily appreciated, may be adjusted to an infinite number of controlling positions so that the speed of rotation of the feed nut and, consequently, the speed of endwise movement of the feed screw may likewise be effected in infinite degrees.

In the event that it be desired to preclude rotation of the feed nut altogether the valve 62 is moved to the limiting position wherein the concave surface 69 directly overlies the rounded edges 70 of the runner vanes 71. In this position of the valve there will be little or no circulation of driving fluid in the coupling and the feed nut will remain stationary or may be readily held thus by gripping the hand-wheel 83 on the feed nut usually provided for this purpose. If then the turbine is continued in operation the driving elements between the turbine and the feed screw will cause the latter to move rapidly in a rearwardly direction for retracting the drilling implement.

I claim:

1. A drilling machine, comprising a rotary feed screw, a motor, a rotary feed nut in threaded engagement with the feed screw for imparting endwise movement thereto, a drive shaft driven by the motor, gear means on the feed screw, a driving connection between said means and the drive shaft for rotating the feed screw, a driven shaft, a driving connection between the driven shaft and the feed nut to effect the rotation of the feed nut at a faster rate than the feed screw, a driving member on the drive shaft, a driven member on the driven shaft, means for inductively associating the driving member with the driven member, and means for selectively varying the torque delivered by the driving member to the driven member to vary the speed of rotation of the feed nut.

2. A drilling machine, comprising a rotary feed screw, a motor, a rotary feed nut in threaded engagement with the feed screw for imparting endwise feeding movement thereto, a drive shaft driven by the motor, gear means on the feed screw, a driving connection between said means and the drive shaft, a driven shaft connected to the feed nut for rotating the feed nut, and a fluid coupling for transmitting rotary motion from the drive shaft to the driven shaft.

3. A drilling machine, comprising a rotary feed screw, a motor, a rotary feed nut in threaded engagement with the feed screw for imparting endwise feeding movement thereto, a drive shaft driven by the motor and geared to the feed screw, a driven shaft, a fluid coupling for transmitting rotary motion from the drive shaft to the driven shaft, and a driving connection between the driven shaft and the feed nut to effect the rotation of the feed nut at a faster rate than the feed screw.

4. A drilling machine, comprising a rotary feed screw, a motor, a rotary feed nut in threaded engagement with the feed screw for imparting endwise movement thereto, a drive shaft driven by said motor and geared to the feed screw to impart rotary motion thereto, a driven shaft, a driving connection between the driven shaft and the feed nut to effect the rotation of the feed nut at a faster rate than the feed screw, a fluid coupling for transmitting rotary motion from the drive shaft to the driven shaft, and valve means adjustable to an infinite number of controlling positions to cause variations in the rate of circulation of the fluid in the coupling for varying the speed of rotation of the feed nut.

5. A drilling machine, comprising a rotary feed screw, a motor, a rotary feed nut in threaded engagement with the feed screw for imparting endwise movement thereto, a drive shaft driven by the motor and geared to the feed screw, a driven shaft for rotating the feed nut, a driving connection between the driven shaft and the feed nut to effect the rotation of the feed nut at a faster rate than the feed screw, a fluid coupling comprising a driving member on the drive shaft and a driven member on the driven shaft, and valve means in the coupling adjustable to an infinite number of controlling positions to vary the flow of fluid from one member to the other for varying the speed of the driven member.

6. A drilling machine, comprising a rotary feed screw, a motor, a rotary feed nut in threaded engagement with the feed screw for imparting endwise movement thereto, a drive shaft driven by the motor and geared to the feed screw, a driven shaft for rotating the feed nut, a driving connection betwen the driven shaft and the feed nut to effect the rotation of the feed nut at a faster rate than the feed screw, a fluid coupling comprising an impeller on the drive shaft and a runner on the driven shaft, and valve means adjustable to an infinite number of controlling positions for controlling the flow of fluid from the vanes of the runner to vary the speed of the driven shaft.

7. A drilling machine, comprising a rotary feed screw, a motor, a rotary feed nut in threaded engagement with the feed screw for imparting endwise movement thereto, a drive shaft driven by the motor and geared to the feed screw, a driven shaft for rotating the feed nut, a driving connection between the driven shaft and the feed nut to effect the rotation of the feed nut at a faster rate than the feed screw, a fluid coupling comprising an impeller on the drive shaft and a runner on the driven shaft, and means for varying the return flow of fluid to the impeller to vary the speed of the driven shaft.

8. A drilling machine, comprising a rotary feed screw, a motor, a rotary feed nut in threaded engagement with the feed screw for imparting endwise movement thereto, a drive shaft driven by said motor and geared to the feed screw to impart rotary motion thereto, a driven shaft, a driving connection between the driven shaft and the feed nut to effect the rotation of the feed nut at a faster rate than the feed screw, a fluid coupling comprising an impeller on the drive shaft and a runner on the driven shaft, and a valve in the coupling to simultaneously throttle the flow of fluid into the impeller and the flow of fluid from the runner for varying the speed of the driven shaft.

9. A drilling machine, comprising a rotary feed screw, a motor, a rotary feed nut in threaded engagement with the feed screw for imparting endwise movement thereto, a drive shaft driven by the motor and geared to said screw for imparting rotary motion thereto, a driven shaft, a driving connection between the driven shaft and the feed nut to effect the rotation of the feed nut at a faster rate than the feed screw, a fluid coupling comprising an impeller on the drive shaft and a runner on the driven shaft, and a valve in the coupling to cooperate with the vanes of the impeller and the runner to control the circulation of fluid in the coupling.

10. A drilling machine, comprising a rotary feed screw, a motor, a rotary feed nut in threaded engagement with the feed screw for imparting endwise movement thereto, a drive shaft driven by the motor, gear means on the feed screw, a driving connection between said means and the drive shaft for rotating the feed screw, a driven shaft, a driving connection between the driven shaft and the feed nut to effect the rotation of the feed nut at a faster rate than the feed screw, a driving member on the drive shaft, a driven member on the driven shaft hydraulically associated with the driving member, a valve for controlling the circulation of fluid between said members and having a stem slidable within the driven shaft, and means connected to said stem for selectively operating said valve.

JAMES H. ANDERSON.

REFERENCES CITED

The following references are of record in the file of this patent:

UNITED STATES PATENTS

| Number | Name | Date |
| --- | --- | --- |
| 1,847,693 | Kindewater | Mar. 1, 1932 |
| 1,972,175 | Vessey | Sept. 4, 1934 |
| 2,030,636 | Jeffrey | Feb. 11, 1936 |
| 2,083,194 | Johnson | June 8, 1937 |
| 2,096,070 | Sinclair | Oct. 19, 1937 |
| 2,104,608 | Cox | Jan. 4, 1938 |
| 2,127,733 | Kugel | Aug. 23, 1938 |
| 2,228,098 | Vaupel | Jan. 7, 1941 |
| 2,242,739 | Anderson | May 20, 1941 |
| 2,283,842 | Yingling | May 19, 1942 |
| 2,331,179 | Fossum | Oct. 5, 1943 |
| 2,372,748 | Swift | Apr. 3, 1945 |
| 2,375,991 | Hoffar | May 15, 1945 |

FOREIGN PATENTS

| Number | Country | Date |
| --- | --- | --- |
| 20,317 | Great Britain | Sept. 12, 1906 |
| 88,935 | Sweden | Apr. 6, 1937 |